United States Patent
Buckley

(10) Patent No.: US 10,853,120 B2
(45) Date of Patent: Dec. 1, 2020

(54) USER PERSISTENCE DATA MOVED BETWEEN INDIVIDUAL COMPUTE ENVIRONMENTS AND SESSION HOST ENVIRONMENTS

(71) Applicant: CITRIX SYSTEMS, INC., Fort Lauderdale, FL (US)

(72) Inventor: William Buckley, West Roxbury, MA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/297,843

(22) Filed: Mar. 11, 2019

(65) Prior Publication Data

US 2020/0293347 A1 Sep. 17, 2020

(51) Int. Cl.
*G06F 9/455* (2018.01)
*G06F 16/11* (2019.01)
*G06F 9/451* (2018.01)

(52) U.S. Cl.
CPC ......... *G06F 9/45558* (2013.01); *G06F 9/452* (2018.02); *G06F 16/119* (2019.01); *G06F 16/128* (2019.01); *G06F 2009/4557* (2013.01); *G06F 2009/45595* (2013.01)

(58) Field of Classification Search
CPC ......... G06F 9/45558; G06F 2009/4557; G06F 16/119; G06F 16/128
See application file for complete search history.

(56) References Cited

U.S. PATENT DOCUMENTS

| | | | |
|---|---|---|---|
| 9,176,744 B2 | 11/2015 | Lee | |
| 9,538,345 B2 | 1/2017 | Sah | |
| 2013/0073703 A1 | 3/2013 | Das et al. | |
| 2013/0262390 A1* | 10/2013 | Kumarasamy | ...... H04L 67/2804 707/649 |
| 2013/0275973 A1* | 10/2013 | Greenfield | .......... G06F 9/45558 718/1 |
| 2014/0006346 A1 | 1/2014 | Davis | |
| 2016/0042090 A1* | 2/2016 | Mitkar | ................ G06F 11/1448 707/649 |

(Continued)

FOREIGN PATENT DOCUMENTS

GB    2510199    7/2014

OTHER PUBLICATIONS

U.S. Appl. No. 15/718,270, filed Sep. 28, 2017 Midgley.

*Primary Examiner* — Tuan C Dao
(74) *Attorney, Agent, or Firm* — Allen, Dyer, Doppelt + Gilchrist, PA

(57) ABSTRACT

A virtual server includes one or more processors to determine a user layer from a user's personalization container, with the user layer associated with a source operating system computing environment and configured to store modifications to file system objects and registry objects made by the user within the source operating system computing environment. A snapshot of differences between a source operating system layer within the source operating system computing environment and a target operating system layer within a target operating system computing environment is determined. The user layer is modified based on a migration policy so that the file system objects and registry objects are compatible with the target operating system computing environment.

20 Claims, 8 Drawing Sheets

(56) References Cited

U.S. PATENT DOCUMENTS

2017/0366606 A1* 12/2017 Ben-Shaul .............. G06F 3/064
2018/0113625 A1*  4/2018 Sancheti ................ G06F 3/065
2018/0113705 A1   4/2018 Webb et al.
2018/0114002 A1   4/2018 Webb et al.

* cited by examiner

USER PERSISTENCE DATA MOVED BETWEEN INDIVIDUAL COMPUTE ENVIRONMENTS AND SESSION HOST ENVIRONMENTS

TECHNICAL FIELD

The present disclosure relates to desktop virtualization, and more particularly, to moving user persistence data between individual compute environments and session host environments.

BACKGROUND

Many enterprises are using desktop virtualization to provide a more flexible option to address the varying needs of their end users. Desktop as a Service (DaaS) is the delivery of virtual desktops offered as a hosted service by a service provider.

Desktop virtualization may be implemented as individual compute environments or session host environments. Individual compute environments are based on Virtual Desktop Infrastructure (VDI), and session host environments are based on Remote Desktop Services (RDS).

VDI provides individual desktop operating system instances (e.g., Windows 10) for each user. RDS runs in a single shared-server operating system (e.g., Windows Server 2016) and allows multiple users to share a single instantiation of the Windows operating system. Generally, the end user is getting better performance with VDI because of the dedicated resources, but the dedicated resources come at a higher cost. Also, VDI licensing is generally more expensive and less flexible than equivalent RDS licenses.

With desktop virtualization, it is common to provide a certain level of persistence to end users. Traditionally, the more persistence of data and applications that end users are afforded, the higher the information technology (IT) cost of supporting that environment exists. A common middle ground is to provide profile data persistence to users of VDI or RDS.

With the advent of layering, there is an operational efficiency to enable fully non-persistent environments while giving end users the ability of full persistence of nearly all applications and data that the user would like to install or modify. However, unlike profile data, such user level data is highly tied to the underlying operating system (OS) instantiation and cannot move easily between different computing environments (e.g., from a VDI environment to a session host environment).

SUMMARY

A virtual server includes at least one processor to determine a user layer from a user's personalization container, wherein the user layer is associated a source operating system computing environment and configured to store modifications to file system objects and registry objects made by the user within the source operating system computing environment. A snapshot of differences between a source operating system layer within the source operating system computing environment and a target operating system layer within a target operating system computing environment is determined. The user layer is modified, based on a migration policy, so that the file system objects and registry objects are compatible with the target operating system computing environment.

The modified user layer advantageously allows user persistence data (i.e., user layer) supporting desktop virtualization to be seamlessly moved between different computing environments. IT administrators may move now users' persistent data from an individual compute environment to a session host environment, and vice-versa.

The user layer may be modified prior to the user initiating a log in process to the virtual server. The at least one processor is further configured to, in response to the user initiated log in process, mount the modified user layer to the target operating system layer and at least one application layer to create a single composited layered image. The single composited layered image is provided to the user as a virtual desktop.

Alternatively, the user layer may be modified during a user log in process to the virtual server. The at least one processor is further configured, in response to the user log in process, initiate mounting of the user layer to the target operating system layer and at least one application layer, determine during the mounting that the user layer did not originate with the target operating system and is associated with the source operating system. The user layer is modified based on the migration policy, and mounting of the modified user layer to create a single composited layered image is completed. The single composited layered image is provided to the user as a virtual desktop.

The source operating system computing environment may correspond to an individual compute environment, and the target operating system computing environment may correspond to a session host environment. The individual compute environment is based on Virtual Desktop Infrastructure (VDI), and the session host environment is based on Remote Desktop Services (RDS).

The migration policy includes a list of specific file system objects and registry objects that could potentially be different between the target operating system computing environment and the source operating system computing environment. The migration policy modifies the file system objects and registry objects that are different. The user layer is modified to appear as if it was initially associated with the target operating system.

Another aspect is directed to a method for operating a virtual server. The method includes receiving a user layer from a user's personalization container, wherein the user layer is associated with a source operating system computing environment and configured to store modifications to file system objects and registry objects made by the user within the source operating system computing environment. A snapshot of differences between a source operating system layer within the source operating system computing environment and a target operating system layer within a target operating system computing environment is determined. The user layer is modified, based on a migration policy, so that the file system objects and registry objects are compatible with the target operating system computing environment.

Yet another aspect is directed to a non-transitory computer readable medium for operating a virtual server, and with the non-transitory computer readable medium having a plurality of computer executable instructions for causing the virtual server to perform steps as described above.

DETAILED DESCRIPTION

The present description is made with reference to the accompanying drawings, in which illustrative embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be discussed below, user persistent data (configurations, files and applications) supporting desktop virtualization in virtual computing systems is beneficially seamlessly moved between different operating system computing environments. For example, the persistent data may be moved from individual compute environments (i.e., VDI) to session host environments (i.e., RDS), and vice-versa. IT costs are lower with the session host environments because of the shared resources, whereas performances are better with the individual compute environments because of the dedicated resources. The modifications to the persistent data may be made before the user logs into a virtual server, or may be made during the user log in process. Thus, some described embodiments may provide a virtual computing environment that can be dynamically adjusted between better performance using individual compute environments (i.e., VDI), or lower operation cost using session host environments (i.e., RDS).

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid-state storage devices, and/or any combination thereof.

Figure 1:
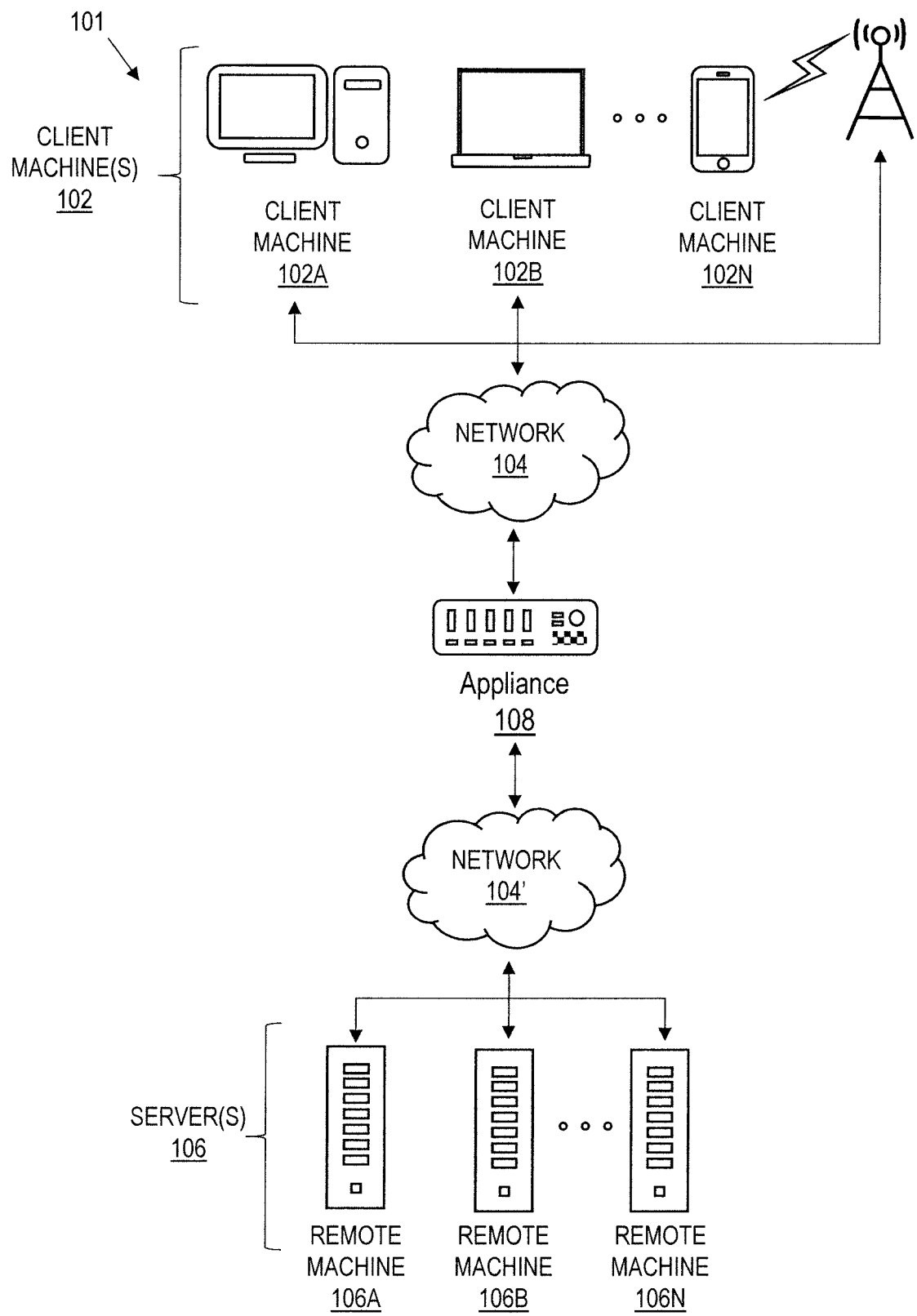
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer or Transport Layer Security Virtual Private Network (SSL/TLS VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
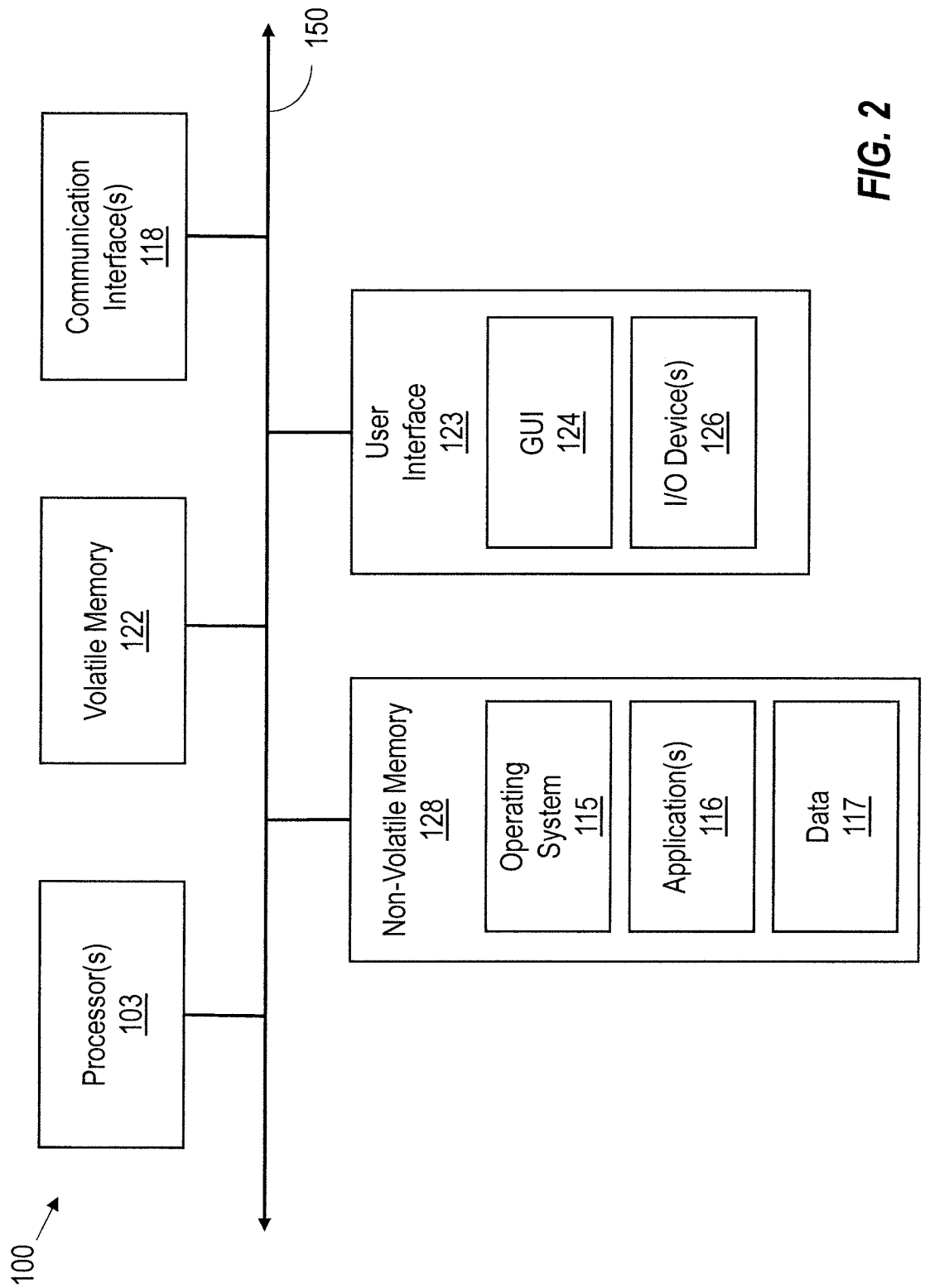
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

As will be discussed below, user persistent data (configurations, files and applications) supporting desktop virtualization is to be seamlessly moved between different operating system computing environments. The user persistent data is also referred to as a user layer. The user layer is unique to the user and follows the user to any machine the user logs in on. Layering is used to mount the user layer to an operating system layer and at least one application layer to create a single composited layered image. Since the user layer is tied to, or associated with, the underlying operating system layer, modifications to the user layer are needed before the user layer is mounted to a different operating system layer. The user layer is modified so that file system objects and registry objects associated with the operating system layer are compatible with the different operating system layer. As such, the systems and methods set forth herein advantageously provide improved performance within a virtualized and/or enterprise computing environment.

Figure 3:
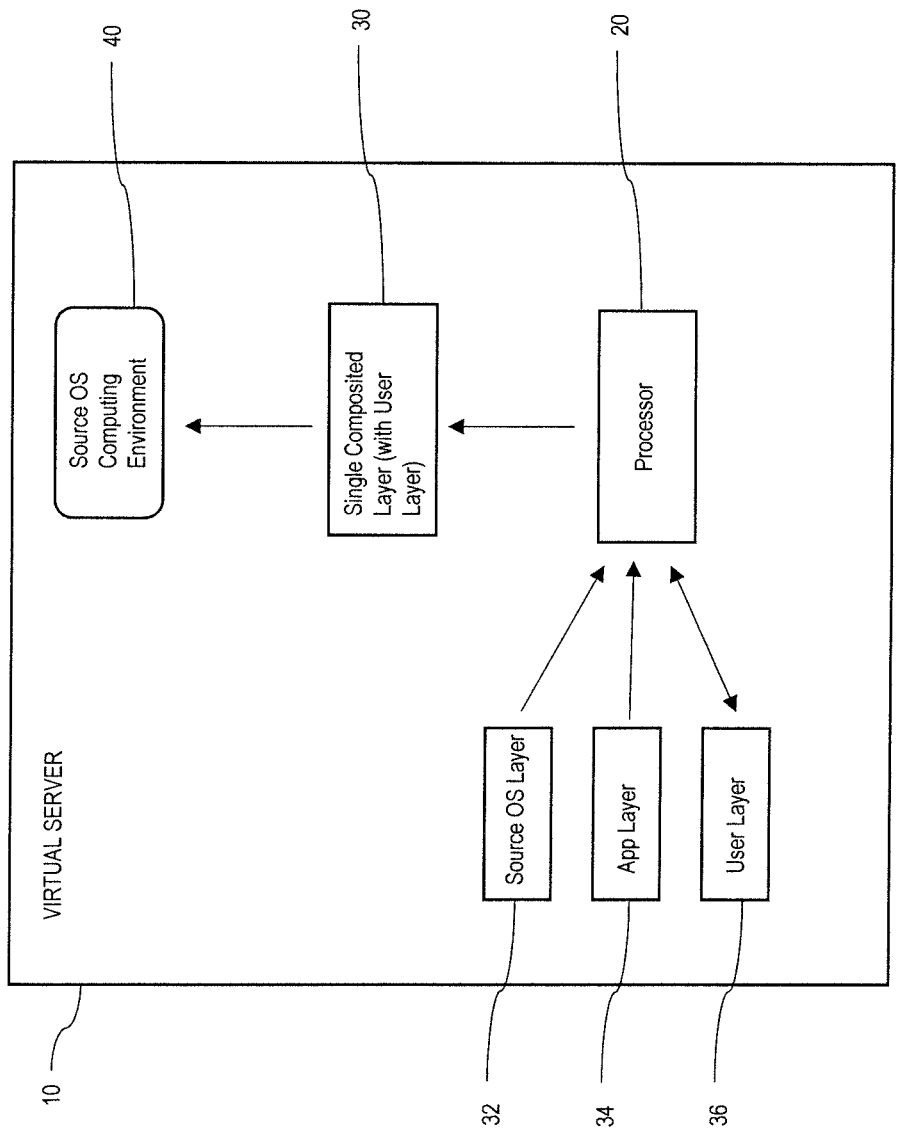
FIG. 3 is a block diagram of a virtual server providing a single composited layered image that includes a user layer associated with a source operating system.

Referring now to FIG. 3, a virtual server 10 has one or more processors 20, which, in some embodiments, may be implemented as a layering engine 20, providing a single composited layered image 30 that includes a user layer 36 associated with a source operating system computing environment 40 will be discussed. The source operating system computing environment 40 may be an individual compute environment, for example, which is based on Virtual Desktop Infrastructure (VDI). VDI provides individual desktop operating system instances (e.g., Windows 10) for each user.

Layering allows information to be persisted for a user or workspace on top of a non-persistent workspace. Layering enables all components of a virtual machine to be independently assigned, patched, and updated. This includes the operating system, applications, and user's settings and data. A more detailed description of layering may be found in U.S. published application no. 2018/0113705; U.S. published application no. 2018/0114002; and U.S. application Ser. No. 15/718,270. These references are assigned to the current assignee of the present disclosure, and are incorporated herein by reference.

The one or more processors 20 will be referred to generally as processor 20. The processor 20 creates the single composited layered image 30 for the source operating system compute environment 40. The single composited layered image 30 is based on a source operating system layer 32, at least one application layer 34, and the user layer 36. Each layer is a container for file system objects and registry entries unique to that layer. By separating the applications from the operating system, and separating the personalization (unique) changes for the machine from the operating system, this allows IT to have one copy of any given operating system or application, regardless of the number of individual compute environment configurations or session host environment configurations.

The user layer 36 is attached during a log in process to the virtual server. The user layer 36 allows a user to save files, install applications, and customize a virtual machine the same way they would any other dedicated machine. The user layer 36 is dedicated to an individual rather than a virtual machine, and is a read/write layer. The user layer 36 may also be referred to as a virtual disk.

After log in to the virtual server, any changes made by the user that modifies the registry or file system of the machine are saved within the user layer 36. Changes include, for example, a background for the desktop as selected by the user, specific plugins added by the user, and specific applications installed by the user. When a user logs off of a machine the user layer 36 is removed from that machine so that it can follow the user to the next machine.

Figure 5:
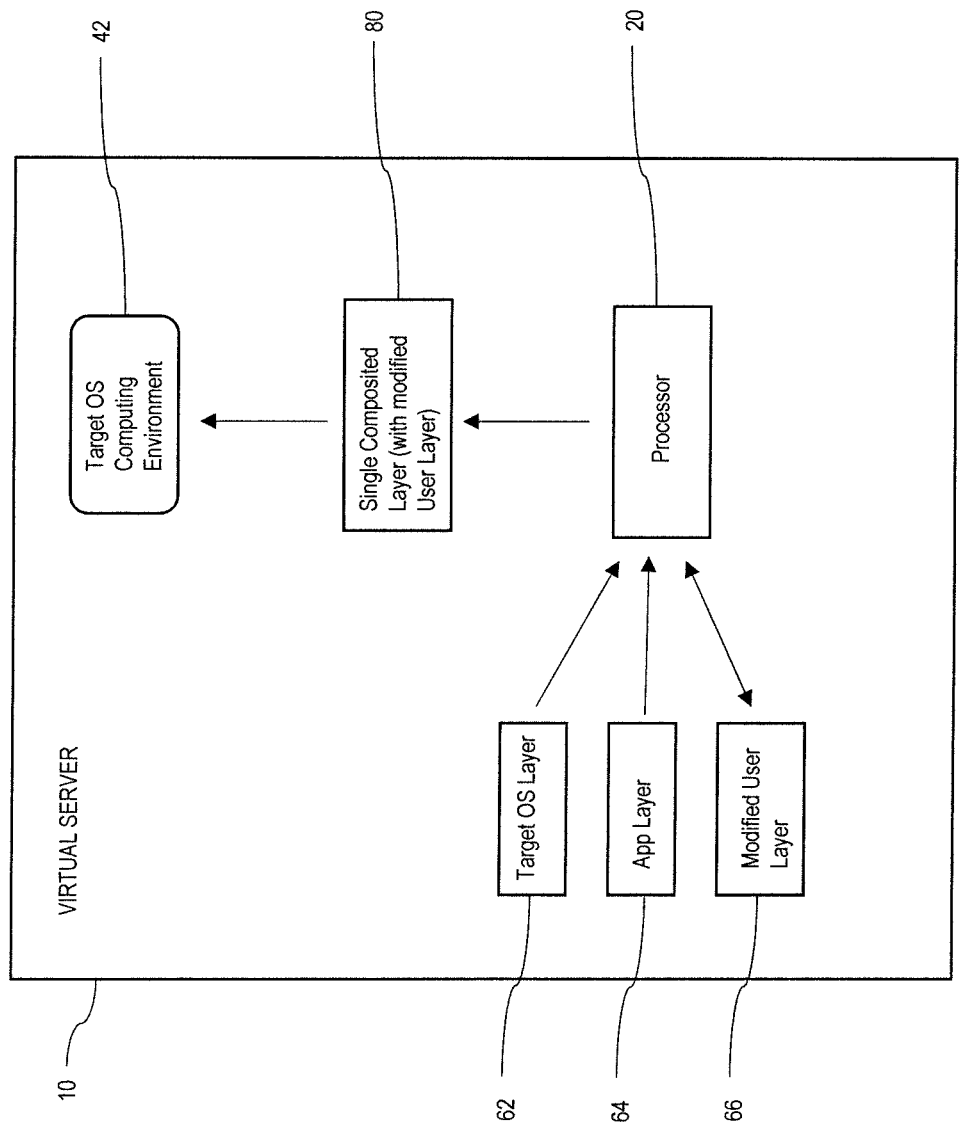
FIG. 5 is a block diagram of the virtual server illustrated in FIG. 3 where the user layer was modified before a user log in process to the virtual server.

An IT administrator may decide to move a group of users from the source operating system computing environment 40 to a target operating system computing environment 42 as shown in FIG. 5. The target operating system computing environment 42 may be a session host environment 42, for example, which is based on Remote Desktop Services (RDS). RDS runs in a single shared-server operating system (e.g., Windows Server 2016) and allows multiple users to share a single instantiation of the Windows operating system. With RDS, multiple user layers 36 are attached to one virtual machine.

Generally, the end user is getting better performance with VDI because of the dedicated resources, but the dedicated resources come at a higher cost. Also, VDI licensing is generally more expensive and less flexible than equivalent RDS licenses.

VDI as the source operating system computing environment 40 and RDS as the target operating system computing environment 42 are illustrative and are not to be limiting. In other examples, RDS is be the source operating system computing environment and VDI is the target operating system computing environment. In this case, the IT administrator is making the move based on performance since each user has their own desktop operating system instance. In addition, other operating systems may be used, as readily appreciated by those skilled in the art.

As noted above, when a user logs off of a machine the user layer 36 is removed from that machine so that the user layer 36 can follow the user to the next machine. The problem is that the user layer 36 is associated with the Windows instance of the source operating system computing environment 40. Consequently, the user layer 36 is not compatible with the Windows Server instance of the target operating system computing environment 42.

Figure 4:
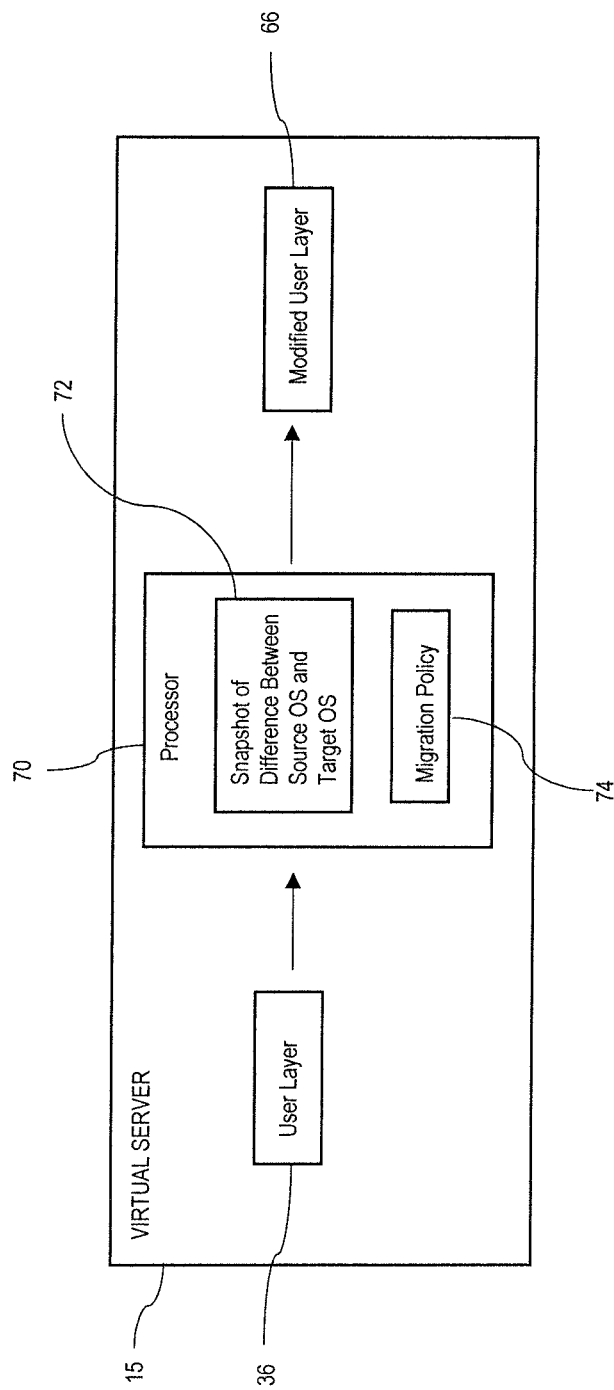
FIG. 4 is a block diagram of a virtual server executing a migration policy used to modify the user layer in FIG. 3 to be compatible with a target operating system.

In some described embodiments, one or more processors 70, which, in some embodiments, may be implemented as a differential engine 70, to modify the user layer 36 that is associated with the source operating system computing environment 40 so that it is compatible with the target operating system computing environment 42. The one or more processors 70 will be referred to generally as processor 70. The processor 70 may be in a separate virtual server 15 as illustrated in FIG. 4, or may be in the same virtual server 10 providing the source and target operating system computing environments 40, 42. The processor 70 may thus be separate from processor 20, or alternatively, the functions of processors 20, 70 may be performed by a single processor. If separate, the respective virtual servers 10, 15 are part of a network of virtual servers providing desktop virtualization to end users.

The processor 70 determines or receives the user layer 36 which may be retrieved from the user's personalization container. The user's personalization container is generally kept on a network addressable storage service and is accessible by the virtual servers 10, 15. The processor 70 may determine the correct user layer 36 based on a user identification of the user that is associated with the user layer 36.

Since both the source operating system in the source operating system computing environment 40 and the target operating system in the target operating system computing environment 42 are known, a snapshot 72 of the difference between the source and target operating systems 32, 62 is determined by one of the processors 20. 70. The processor 20 or 70 focusses on the differences between the source operating system 32 and the target operating system 62.

More particularly, processor 20 or 70 records, in the user layer 36, the login and underlying operating system identifier (and any snapshot data needed to post-process migration fixed at a later time,) every time the user layer 36 is mounted to an operating system layer 32, 62. At this point, the processor 20 or 70 can also check to see if the identifier it is putting in there differs from the last one it was mounted on. The processor 70 includes a migration policy 74 to modify the user layer 36 so that the file system objects and registry objects are compatible with the target operating system computing environment 42.

The processor 70 determines the source operating system 32 and the target operating system 62, as well as the source applications 34 and the target applications 64. The goal of the migration policy is to generate a modified user layer 66 that blends in as if it were associated with the second operating system compute environment 42.

The migration policy includes a check list, or list, of specific file system objects and registry objects that could potentially be different with the second operating system compute environment 42. Each of the items on the list are checked against the migration policy 74, and where needed, are changed so as to be compatible with the second operating system compute environment 42.

The list includes checking path variables between the two different operating systems 32, 62. A path variable specifies a set of directories where executable programs are located.

The path variables in the user layer 36 are changed to match the path variables in the second operating system compute environment 42.

The list also includes checking security descriptors between the two different operating systems 32, 62. Security descriptors are data structures of security information for securable Windows objects. Security descriptors contain discretionary access control lists that contain access control entries that grant or deny access to the user.

Security descriptors are generally based on a monotonic increase from a security key seed that was put onto the initial installation. For instance, the security key seed for a particular application is 1000, and with the next layer that was installed having a series descriptor of 1001. However, the security key seed in the second operating system compute environment 42 may start at 2000. The processor 70 changes the security descriptors in the user layer 36 to be compatible with the numbering of the security descriptors in the second operating system compute environment 42.

Modifying the user layer 36 is also known as scrubbing. Scrubbing is the modification of any file system objects or registry objects to remove, add or change data to ensure the end product (i.e., the single composited layered image 80) that includes the modified user layer 66 associated with the second operating system computing environment 42 will run in a desired manner.

The user layer 36 may be modified prior to the user initiating a log in process to the virtual server 10. This option is beneficial since all the changes to the user layer 36 are made before the user logs in. The modification may take seconds to tens of minutes depending on the level of changes required. Pre-compiling the modified user layer 66 ahead of time avoids a wait time for the user during log in to the virtual server 10.

Referring now to FIG. 5, the modified user layer 66 is available when the user logs into the virtual server 10. The steps performed with the user layer 36 in FIG. 3 are the same as the steps to be performed with the modified user layer 66 in FIG. 5. The modified user layer 66 blends in as if it were tied to the second operating system compute environment 42.

The layering engine 20 creates the single composited layered image 80 for the target operating system compute environment 42. The single composited layered image 80 is based on a target operating system layer 62, at least one application layer 64, and the modified user layer 66.

The modified user layer 66 is attached during a log in process to the virtual server 10. The modified user layer 36 still allows the user to save files, install applications, and customize a virtual machine the same way they would any other dedicated machine. After log in to the virtual server 10, any changes made by the user that modifies the registry or file system of the machine are saved within the modified user layer 66.

The processor 70 is not needed as long as the user continues to log in to the target operating system computing environment 42. However, if the user was directed to log back into the source operating system computing environment 40, then the processor 70 would be needed to modify the modified user layer 66 so that it is compatible with the source operating system computing environment 40.

Figure 6:
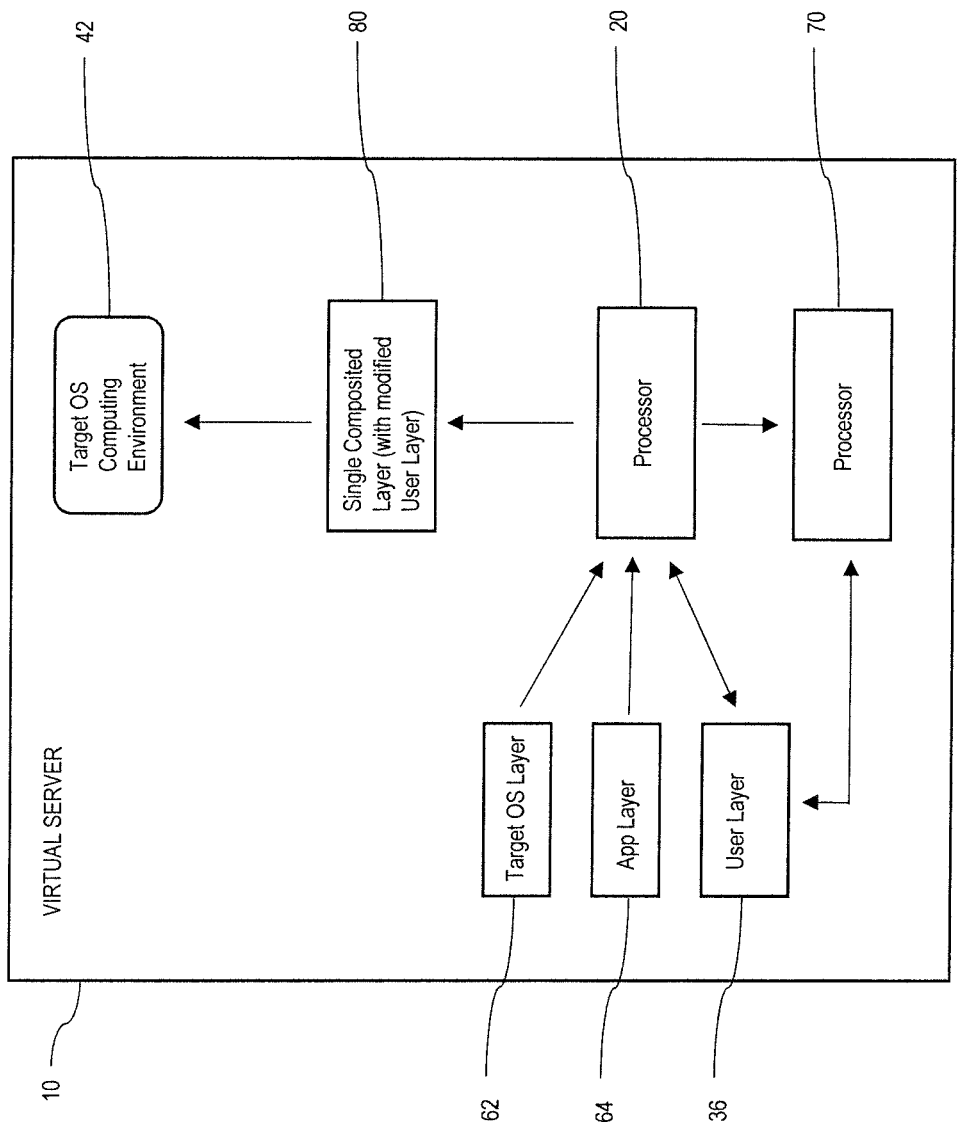
FIG. 6 is a block diagram of the virtual server illustrated in FIG. 3 where the user layer is modified during a user log in process to the virtual server.

Referring now to FIG. 6, the user layer 36 may be modified during a user log in process to the virtual server 10. Modification of the user layer 36 is performed real time in generating the modified user layer 66.

In some described embodiments, the processor 20 is configured to perform, in response to the user log in process, a series of steps. The steps include determining or retrieving the user layer 36 from the user's personalization container, and initiate mounting of the user layer 36 to the target operating system layer 62. The processor 20 may determine the user layer 36 based on a user identification of the user that is provided during the user log in process.

A determination is made during the mounting that the user layer 36 did not originate with the target operating system 62 and is associated with the source operating system 32. A unique signature, such as a product ID, is detected by the processor 20 to make this determination.

The processor 20 communicates with the processor 70 to initiate the migration policy to modify the user layer 36. After the user layer 36 has been modified, mounting of the modified user layer 66 to the target operating system layer 62 and at least one application layer 64 is completed by the processor 20 to create a single composited layered image 80 for the target operating system computing environment 42.

The processors 20, 70 are associated with the source and target operating systems 32, 62. Programming of the processors 20, 70 may be in a file system and registry.

Figure 7:
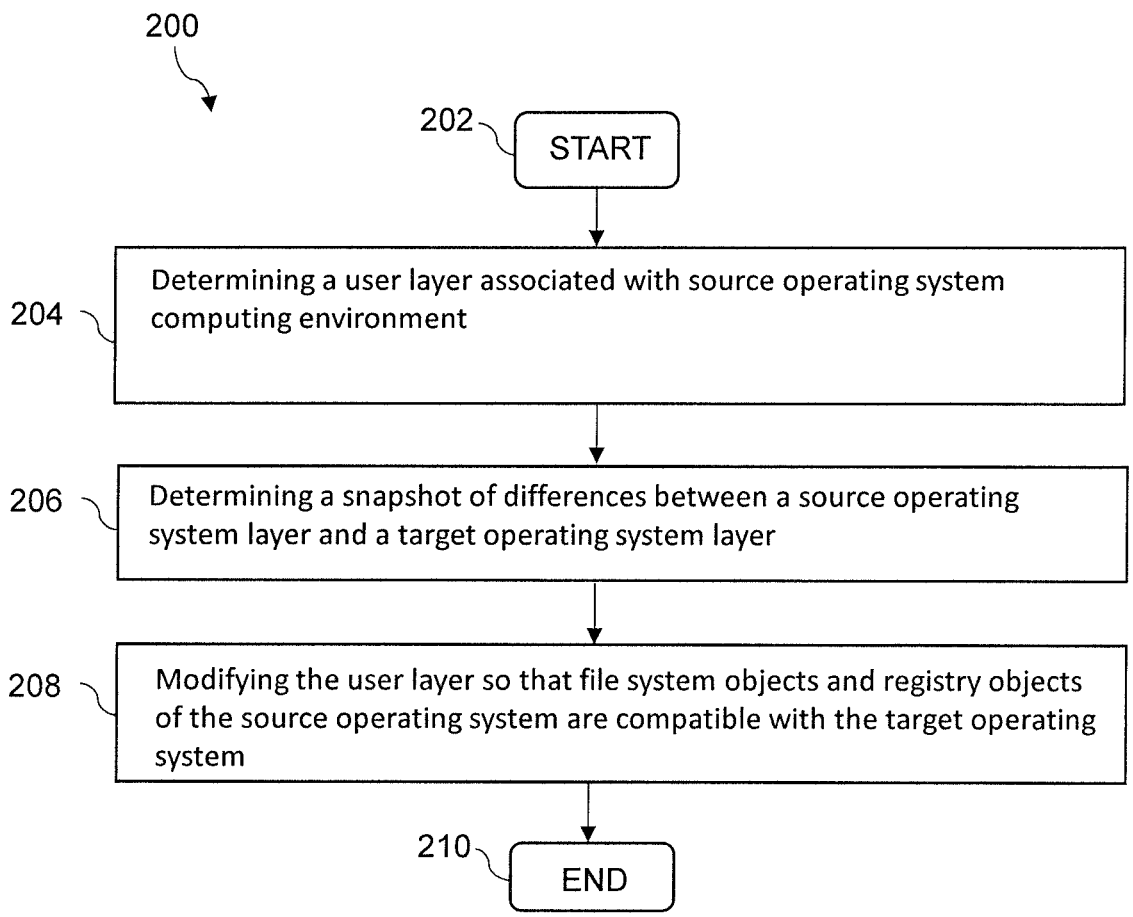
FIG. 7 is a flowchart illustrating a method for operating the virtual server illustrated in FIG. 4.

Referring now to the flowchart 200 in FIG. 7, a method for operating the virtual server 15 will be discussed. From the start (Block 202), the method includes determining and retrieving a user layer 36 from a user's personalization container at Block 204. For example, the virtual server 15 might determine the user layer 36 based on a user identification of the user that is associated with the user layer 36. The user identification might be provided by an IT administrator, for example. The user layer 36 is associated with a source operating system computing environment 40 and is configured to store modifications to file system objects and registry objects made by the user within the source operating system computing environment 40.

A snapshot 72 of differences between a source operating system layer 32 within the source operating system computing environment 40 and a target operating system layer 62 within a target operating system computing environment 42 is determined at Block 206. The snapshot 72 is determined by one of processors 20, 70. More particularly, one of the processors 20, 70 records, in the user layer 36, the login and underlying operating system identifier (and any snapshot data needed to post-process migration fixed at a later time,) every time the user layer 36 is mounted to an operating system layer 32, 62. At this point, the processor 20 or 70 can also check to see if the identifier it is putting in there differs from the last one it was mounted on. At Block 208 the user layer 36 is modified based on a migration policy 74 so that the file system objects and registry objects in the source operating system environment are compatible with the target operating system computing environment 42. The method ends at Block 210.

Figure 8:
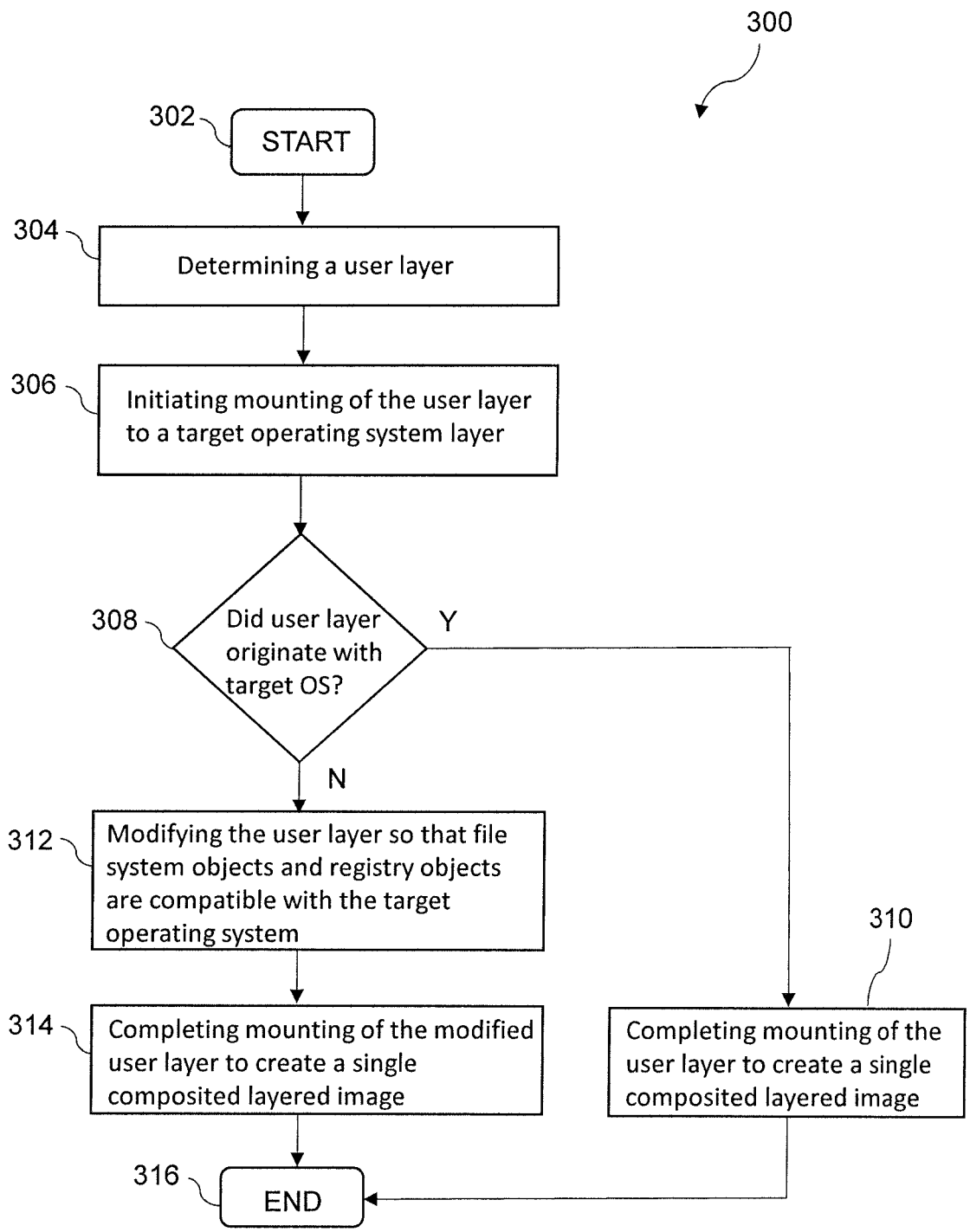
FIG. 8 is a flowchart illustrating a method for operating the virtual server illustrated in FIG. 6.

Referring now to the flowchart 300 in FIG. 8, a method for modifying the user layer 36 during a log in process to the virtual sever 10 will be discussed. From the start (Block 302), the method includes determining and retrieving the user layer 36 from the user's personalization container at Block 304. Mounting of the user layer 36 to the target operating system layer 62 is initiated at Block 306.

During the mounting a determination is made at Block 308 on if the user layer 36 originated with the target operating system 62. If the user layer 36 did originate with the target operating system 62, then mounting of the user layer 36 to the target operating system layer 62 and the at least one application layer 64 is completed to create a single composited layered image 30 at Block 310, and the method ends at Block 316.

If the user layer 36 did not originate with the target operating system 62, then the user layer 36 is modified so that file system objects and registry objects of the source operating system 32 are compatible with the target operating system 62 at Block 312. Mounting of the modified user layer 66 to the target operating system layer 62 and the at least one application layer 64 is completed at Block 314 to create a single composited layered image 80. The method ends at Block 316.

Another aspect is directed to a non-transitory computer readable medium for operating a virtual server 10, and with the non-transitory computer readable medium having a plurality of computer executable instructions for causing the differential engine 70 to perform a series of steps. The steps include determining and retrieving a user layer 36 from a user's personalization container, with the user layer 36 being associated with a source operating system computing environment 40 and configured to store modifications to file system objects and registry objects made by the user within the source operating system computing environment 40.

A snapshot 72 of differences between a source operating system layer 32 within the source operating system computing environment 40 and a target operating system layer 62 within a target operating system computing environment 42 is determined. The user layer 36 is modified based on a migration policy 74 so that the file system objects and registry objects of the source operating system environment 40 are compatible with the target operating system computing environment 42.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A virtual server comprising:
   at least one processor configured to:
      determine a user layer from a user's personalization container, wherein the user layer is associated with a source operating system computing environment and configured to store modifications to file system objects and registry objects made by the user within the source operating system computing environment,
      determine a snapshot of differences between a source operating system layer within the source operating system computing environment and a target operating system layer within a target operating system computing environment, and
      modify the user layer, based on a migration policy, so that the file system objects and registry objects are compatible with the target operating system computing environment.

2. The virtual server according to claim 1 wherein the user layer is modified prior to the user initiating a log in process to the virtual server.

3. The virtual server according to claim 2 wherein the at least one processor is further configured to, in response to the user initiated log in process, mount the modified user layer to the target operating system layer and at least one application layer to create a single composited layered image.

4. The virtual server according to claim 3 wherein the single composited layered image is provided to the user as a virtual desktop.

5. The virtual server according to claim 1 wherein the user layer is modified during a user log in process to the virtual server.

6. The virtual server according to claim 5 wherein the at least one processor is further configured, in response to the user log in process, to:
   initiate mounting of the user layer to the target operating system layer;
   determine during the mounting that the user layer did not originate with the target operating system and is associated with the source operating system;
   modify the user layer based on the migration policy; and
   complete mounting of the modified user layer to the target operating system layer and the at least one application layer to create a single composited layered image.

7. The virtual server according to claim 6 wherein the single composited layered image is provided to the user as a virtual desktop.

8. The virtual server according to claim 1 wherein the source operating system computing environment corresponds to an individual compute environment, and the target operating system computing environment corresponds to a session host environment.

9. The virtual server according to claim 8 wherein the individual compute environment is based on Virtual Desktop Infrastructure (VDI), and the session host environment is based on Remote Desktop Services (RDS).

10. The virtual server according to claim 1 wherein the migration policy comprises a list of specific file system objects and registry objects that could potentially be different between the target operating system computing environment and the source operating system computing environment, and wherein the file system objects and registry objects that are different are modified to be compatible with the target operating system computing environment.

11. The virtual server according to claim 1 wherein the user layer is modified to appear as if it was initially associated with the target operating system.

12. A method for operating a virtual server, the method comprising:
   receiving a user layer from a user's personalization container, wherein the user layer is associated with a source operating system computing environment and configured to store modifications to file system objects and registry objects made by the user within the source operating system computing environment;
   determining a snapshot of differences between a source operating system layer within the source operating system computing environment and a target operating system layer within a target operating system computing environment; and
   modifying, based on a migration policy, the user layer so that the file system objects and registry objects are compatible with the target operating system computing environment.

13. The method according to claim 12 wherein the user layer is modified prior to the user initiating a log in process to the virtual server.

14. The method according to claim 13 further comprising, in response to the user initiated log in process, mounting the modified user layer to the target operating system layer and at least one application layer to create a single composited layered image.

15. The method according to claim 12 wherein the user layer is modified during a user log in process to the virtual server.

16. The method according to claim 15 further comprising in response to the user log in process:
- initiating mounting of the user layer to the target operating system layer;
- determining during the mounting that the user layer did not originate with the target operating system and is associated with the source operating system;
- modifying the user layer based on the migration policy; and
- completing mounting of the modified user layer to the target operating system layer and the at least one application layer to create a single composited layered image.

17. The method according to claim 12 wherein the source operating system computing environment corresponds to an individual compute environment, and the target operating system computing environment corresponds to a session host environment.

18. The method according to claim 12 wherein the migration policy comprises a list of specific file system objects and registry objects that could potentially be different between the target operating system computing environment and the source operating system computing environment, and wherein the file system objects and registry objects that are different are modified to be compatible with the target operating system computing environment.

19. The method according to claim 12 wherein the user layer is modified to appear as if it was initially associated with the target operating system.

20. A non-transitory computer readable medium for operating a virtual server, and with the non-transitory computer readable medium having a plurality of computer executable instructions for causing the virtual server to perform steps comprising:
- receiving a user layer from a user's personalization container, wherein the user layer is associated with a source operating system computing environment and configured to store modifications to file system objects and registry objects made by the user within the source operating system computing environment;
- determining a snapshot of differences between a source operating system layer within the source operating system computing environment and a target operating system layer within a target operating system computing environment; and
- modifying, based on a migration policy, the user layer so that the file system objects and registry objects are compatible with the target operating system computing environment.

\* \* \* \* \*